United States Patent
Nanavati et al.

(10) Patent No.: US 10,956,661 B2
(45) Date of Patent: Mar. 23, 2021

(54) CONSISTENCY ENFORCEMENT IN MULTI-AUTHOR DOCUMENTS

(71) Applicant: International Business Machines Corporation, Armonk, NY (US)

(72) Inventors: Amit Nanavati, New Delhi (IN); Anil Maddipatla, Hyderabad (IN); Birgit Monika Pfitzmann, Zürich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/421,717

(22) Filed: May 24, 2019

(65) Prior Publication Data

US 2020/0372102 A1 Nov. 26, 2020

(51) Int. Cl.
*G06F 40/166* (2020.01)
*G06F 16/335* (2019.01)
*G06F 16/93* (2019.01)
*G06F 11/07* (2006.01)
*G06F 40/197* (2020.01)

(52) U.S. Cl.
CPC ........ *G06F 40/166* (2020.01); *G06F 11/0745* (2013.01); *G06F 16/337* (2019.01); *G06F 16/93* (2019.01); *G06F 40/197* (2020.01); *G06F 2201/80* (2013.01); *G06F 2201/86* (2013.01)

(58) Field of Classification Search
CPC ...... G06F 40/166; G06F 16/337; G06F 16/93; G06F 40/197; G06F 11/0745
See application file for complete search history.

(56) References Cited

U.S. PATENT DOCUMENTS

| 5,680,530 | A  | 10/1997 | Selfridge et al. |
| 7,650,346 | B2 | 1/2010  | Henaire et al. |
| 7,908,349 | B2 | 3/2011  | Donatelli et al. |
| 9,454,561 | B2 | 9/2016  | Gullin |

(Continued)

FOREIGN PATENT DOCUMENTS

| JP | 2005025543 A | 1/2005 |
| JP | 2008186356 A | 8/2008 |
| JP | 2009288950 A | 12/2009 |

OTHER PUBLICATIONS

Marmolin et al; The Parting of the Ways: Divergence, Data Management and Collaborative Work https://dl.eusset.eu/bitstream/20.500.12015/2521/1/00097.pdf, Sep. 10-14.

(Continued)

*Primary Examiner* — David E Choi
(74) *Attorney, Agent, or Firm* — Garg Law Firm, PLLC; Rakesh Garg; Brian Restauro (57) ABSTRACT

A parameter of a first checker in a profile of the first checker is configured. The parameter comprises a restriction on contents of a modification to a dataset. The modification comprises a write to a portion of the dataset. The dataset is modifiable by a plurality of authors. The first checker has a first checker owner. A first modification to the dataset is validated against a restriction enforced by the first checker according to the parameter. The first modification has a modification owner. Responsive to the validating detecting that the first modification is acceptable, the first modification is allowed.

20 Claims, 9 Drawing Sheets

(56) References Cited

U.S. PATENT DOCUMENTS

| | | | | |
|---|---|---|---|---|
| 2003/0028867 A1* | 2/2003 | Kryloff | ................... | G06F 8/658 |
| | | | | 717/171 |
| 2013/0055074 A1* | 2/2013 | Trese | ................... | G06F 40/197 |
| | | | | 715/255 |
| 2013/0103990 A1* | 4/2013 | Hopper | ............... | G06F 11/0793 |
| | | | | 714/49 |
| 2015/0378710 A1* | 12/2015 | Kabue | ....................... | G06F 8/70 |
| | | | | 717/168 |
| 2019/0068646 A1* | 2/2019 | Hussain | ................ | H04L 63/205 |

OTHER PUBLICATIONS

Sheth, Management of interdependent data: specifying dependency and consistency requirements; IEEE https://ieeexplore.ieee.org/abstract/document/138261/, Aug. 6, 2002.

* cited by examiner

CONSISTENCY ENFORCEMENT IN MULTI-AUTHOR DOCUMENTS

TECHNICAL FIELD

The present invention relates generally to a method, system, and computer program product for managing multi-author documents. More particularly, the present invention relates to a method, system, and computer program product for consistency enforcement in multi-author documents.

BACKGROUND

As used herein, a document includes any component of a set of data stored in a computer system. As such, a document includes both a file stored in file system and a unit of data stored in a database. A document has one or more authors. A document author, as used herein, is any entity that performs a write operation to a document. A document may also have one or more consumers. A document consumer, as used herein, is any entity that performs a read operation to a document.

For example, a team of co-workers working together on a project might choose to keep all project-related status information in a common human-readable document. Some members of the team are document consumers, because they view, but not modify, the document. For example, one of the document consumers might read the document to learn when the next version of the project is due for release. Other members of team are document authors, because they both view and modify the document. For example, one of the document authors might update the document with an additional set of tasks to be completed before release of the next version of the project.

Both a document author and document consumer can be human or non-human actors. For example, if the project co-workers are working on the next release of a software product, an automated system tracking bugs in a previous release of the product could act as a document author, adding each bug as a new task for the next release. Similarly, another automated system reporting project status on a number of projects could act as a document consumer, periodically accumulating this project's information into a report.

SUMMARY

The illustrative embodiments provide a method, system, and computer program product. An embodiment includes a method that configures a parameter of a first checker in a profile of the first checker, wherein the parameter comprises a restriction on contents of a modification to a dataset, the modification comprising a write to a portion of the dataset, the dataset modifiable by a plurality of authors, the first checker having a first checker owner. An embodiment validates, against a restriction enforced by the first checker according to the parameter, a first modification to the dataset, the first modification having a modification owner. An embodiment allows, responsive to the validating detecting that the first modification is acceptable, the first modification.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize, when multiple authors and consumers modify a common document, different authors and consumers have different requirements for the data in that document. If the document does not meet a requirement, a document consumer may be confused. For example, if a document contains task assignments for co-workers on a project, but a task assignment is missing a due date, the consumer assigned to perform that task will not know when the task is due. In addition, a document cannot meet requirements that directly conflict with each other. For example, one consumer of the example task-assignment document might require that the document be only in English, while another consumer of the same document might require that the document be in only Chinese.

The illustrative embodiments recognize that problems involving multiple, potentially conflicting document requirements increase as the document size and the number of document authors or consumers grows. For example, identifying that one line in a document specifies that a variable default be 0, while another line specifies that the same variable's default is −1, is an easier task when the document itself contains twenty lines than when the document contains twenty thousand lines.

The illustrative embodiments recognize that problems involving multiple, potentially conflicting document requirements also increase when a multi-author document is authored or consumed by non-human entities. For example, a document in a markup language such as Extensible Markup Language (XML) or Hypertext Markup Language (HTML), a file format containing data objects such as JavaScript Object Notation (JSON), or source code for a computer program, is human-readable, but describes structured information in a form that is also machine-readable. However, non-human consumers may take unexpected or undesired actions when such a document is not in an expected format, or a value in such a document does not have a valid value or type. For example, if a machine consumer is expecting a Boolean value (a value that can only be true or false) but receives a real number instead, the consumer of the value could act erroneously.

The illustrative embodiments also recognize that checking for conformance with, and consistency among, the requirements of multiple authors of a document is conveniently done when processing a modification to the document. At this time, if a modification does not conform to one or more requirements, an author of the modification can conveniently replace the modification with one that does conform. As well, there is no opportunity for an error caused by a nonconforming modification to propagate through document consumers. Consequently, the illustrative embodiments recognize a need for consistency checks of a multi-author document when the document is created or modified.

The illustrative embodiments recognize that the presently available tools or solutions do not address these needs or provide adequate solutions for these needs. The illustrative embodiments used to describe the invention generally address and solve the above-described problems and other problems related to consistency enforcement in multi-author documents.

An embodiment can be implemented as a software application. The application implementing an embodiment can be configured as a modification of an existing document management system (including a file system or database management system), as a separate application that operates in conjunction with an existing document management system, a standalone application, or some combination thereof.

Particularly, some illustrative embodiments provide a method by which consistency checks of a multi-author document are performed when the document is created or modified. The method also provides for consistency checking of the consistency checks themselves.

An embodiment maintains a profile of at least one checker. The profile includes one or more parameters, where a parameter is a restriction on contents of a modification to a document. Within the profile, an embodiment configures at least one parameter. A checker enforces a restriction on a modification to a document. Each checker has an owner responsible for maintaining the checker and resolving alerts the checker generates.

In one embodiment, a base form of a checker has the ability to interpret a particular type or format of document. For example, one base form is able to interpret a file in one of the Microsoft Office formats, such as .docx (for text) or .xlsx (for a spreadsheet). (Microsoft Office is a registered trademark of Microsoft, Inc. in the United States and other countries.) Another example base form is able to interpret a file written in a markup language such as HTML or XML. A third example base form is able to interpret data stored in a database. From the base form, a checker author can adapt a checker to specific needs. For example, a checker author could adapt an XML checker to check that a particular variable has a value of a particular type, such as an integer or a positive integer. In another embodiment, a checker author does not use a base form, but instead configures a checker using another suitable technique.

An embodiment can configure a parameter of a checker to apply to all versions of a document, or only specific versions. An embodiment can configure a parameter of a checker as usable within a particular date or time range, before or after a particular date or time, or without a time restriction. An embodiment can configure a parameter of a checker to apply to a specific document, to all documents having a specific characteristic (e.g. all documents in a specific area of a file system, or all documents with a .doc file extension), to all documents used by a specific application (e.g. a project management application), or to all documents a system manages.

An embodiment manages checkers. Managing checkers includes storing one or more checkers, managing ownership information and profile information for a checker, managing time, version, or document specifications for a checker, and managing other information relating to using a checker.

When a document author attempts a write to a document, an embodiment determines whether a checker is associated with the document. If so, an embodiment validates the modification to the document against a restriction enforced by a checker associated with the document. Each modification has a modification owner, responsible for resolving alerts generated by the modification.

An embodiment is configurable to run checker validations in any order. One embodiment runs checkers in chronological order, based on each checker's date of last modification, with the oldest checker run first. Another embodiment runs checkers in reverse chronological order, with the newest checker run first. Another embodiment runs checkers in an order specified by a checker owner. For example, a checker owner might specify that a particular checker should always run first. Another embodiment launches a set of checkers at one time and executes the set in parallel. Other orders of execution for checkers, and combinations of orders, are also possible and contemplated within the scope of the illustrative embodiments.

If no checker reports an error in the modification, an embodiment stores the modified document. If, instead, a checker reports an error in the modification, an embodiment rejects the modification. In a rejection, an embodiment does not store the modified document, instead keeping the document in its pre-modification state. As well, an embodiment alerts both the modification owner and the owner of each checker that reported an error. Once the modification owner and checker owner receive alerts, they can resolve the conflict outside the scope of the embodiments.

For example, consider a modification to an example document that changes the value of a variable, "optimizable", from true to false. This document currently has three example checkers. Checker 1 includes a parameter enforcing a restriction that "optimizable" must be either true or false. Checker 2 includes a parameter enforcing a restriction that the numerical value for another variable, "offeringId", must be in a list of valid identification values. Checker 3 includes a parameter enforcing a restriction that the value of another variable, "displayOrder", must be a number. Because the modification passes all three example checkers, an embodiment accepts the modification.

For the same example document and checkers, another modification changes the value of the "displayOrder" variable to true. This time, checker 3 fails, because true is not a number in this example system. As a result, an embodiment generates an alert, to both the modification owner and the owner of checker 3, that the modification is attempting to set "displayOrder" to an invalid value.

Another embodiment validates a modification to a document against a restriction enforced by a checker associated with the document after the modified document is written. If no checker reports an error in the modification, an embodiment considers the modification to be valid. If, instead, a checker reports an error in the modification, an embodiment rejects the modification by restoring the document to its pre-modification state. As well, an embodiment alerts both the modification owner and the owner of each checker that reported an error. Once the modification owner and checker owner receive alerts, they can resolve the conflict outside the scope of the embodiments.

When a document consumer attempts a read of the document, an embodiment determines whether a checker is associated with the document. If so, an embodiment validates the document against one or more configured checkers. If no checker reports an error, an embodiment supplies the document to the consumer. If, instead, a checker reports an error in the document, an embodiment returns the document to a previous, validated state in which no checker reports an error. Because a document is validated at each modification, and hence only a validated document can be written, a read error should not occur. However, checking a document on a read as well as a write is an additional opportunity to catch and correct an unexpected error condition if it does occur.

An embodiment is also usable for consistency checking extracted data from an archive. In one embodiment, an archive of documents, and any checkers for the archive, are packaged together. When a document consumer attempts a read of a document from the archive, an embodiment uses one or more checkers packaged with the archive to validate the document. If no checker reports an error, an embodiment supplies the document to the consumer. If, instead, a checker reports an error in the document, an embodiment raises an alert and discards the document extraction.

A profile of a checker is also modifiable. In particular, a restriction enforced by a checker can be modified. When a checker owner attempts to modify a checker, an embodiment validates the checker being modified against documents to which the checker applies. Because each document has previously passed the already-existing checkers, validating against the document substitutes for validating against the set of already-existing checkers.

If the checker being modified does not report an error, an embodiment stores the modified checker and adds the modified checker to the set of checkers used to validate later document modifications. If, instead, the checker being modified reports an error, an embodiment rejects the checker being modified and alerts the owner of the checker being modified. Once the owner receives alerts, the conflict can be resolved outside the scope of the embodiments.

For example, consider an example new checker intended to check an example document. This document currently has one example checker that enforces a restriction that the value of a variable in the document, "displayOrder", must be a number. The example new checker enforces a restriction that the value of another variable in the document, "optimizable", must be either true or false. Because, in the document, "optimizable" is set to true, meeting the new restriction, an embodiment accepts the new example checker.

Continuing the example, a second new example checker is also intended to check the example document. The second new checker enforces a restriction that the "displayOrder" variable must be a string. This time, because the existing checker specifies that "displayOrder" must be a number, in the document "displayOrder" is set to a number. Because a variable cannot be both a number and a string at the same time, the validation fails. As a result, an embodiment alerts the author of the second new example checker.

The manner of consistency enforcement in multi-author documents described herein is unavailable in the presently available methods in the technological field of endeavor pertaining to multi-author document management. A method of an embodiment described herein, when implemented to execute on a device or data processing system, comprises substantial advancement of the functionality of that device or data processing system in performing consistency checks on a multi-author document when the document is created or modified. As well, the consistency checks themselves are also checked for conflicts.

The illustrative embodiments are described with respect to certain types of documents, checkers, document managers, validations, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
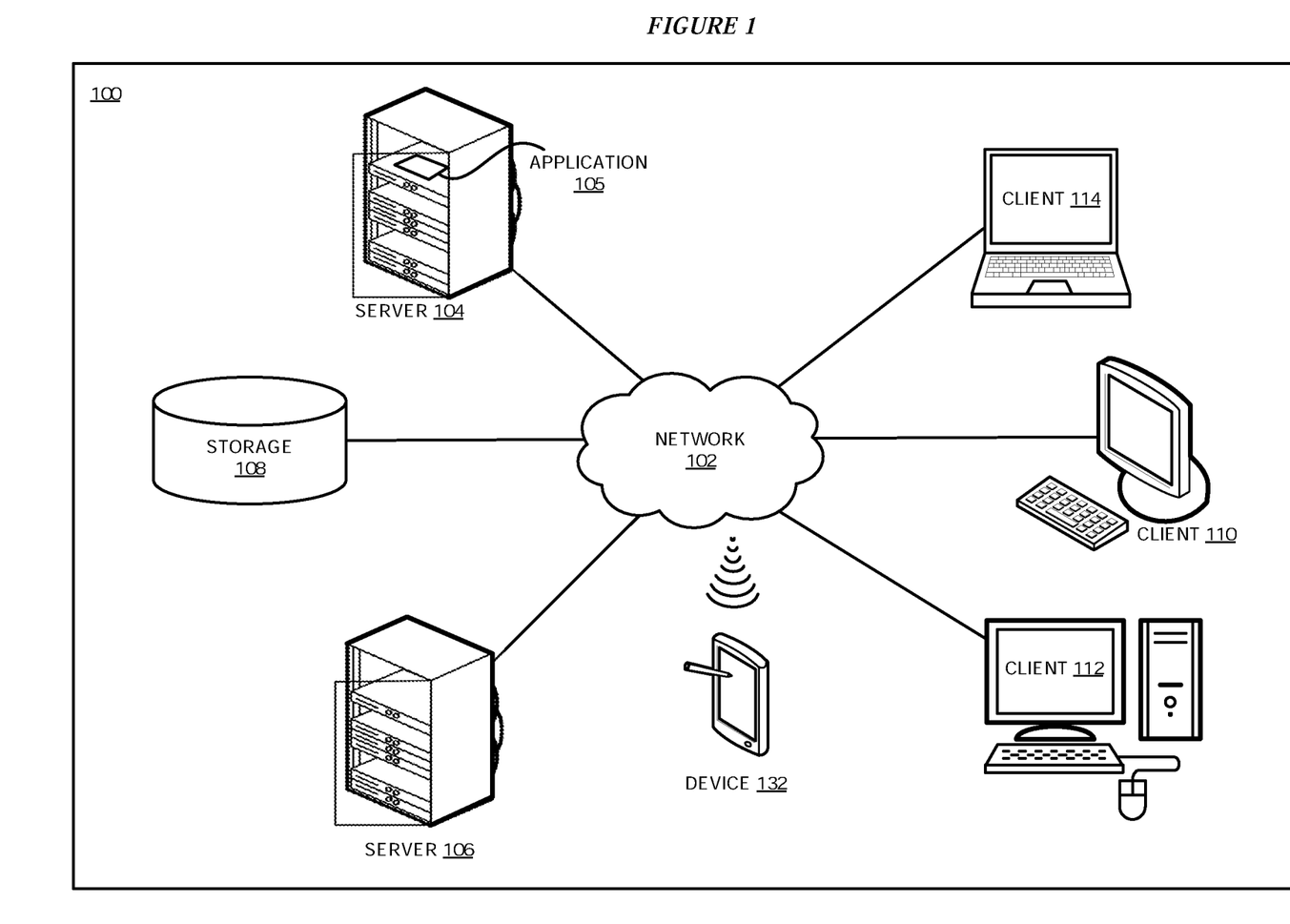
FIG. 1 depicts a block diagram of a network of data processing systems in which illustrative embodiments may be implemented.
Figure 2:
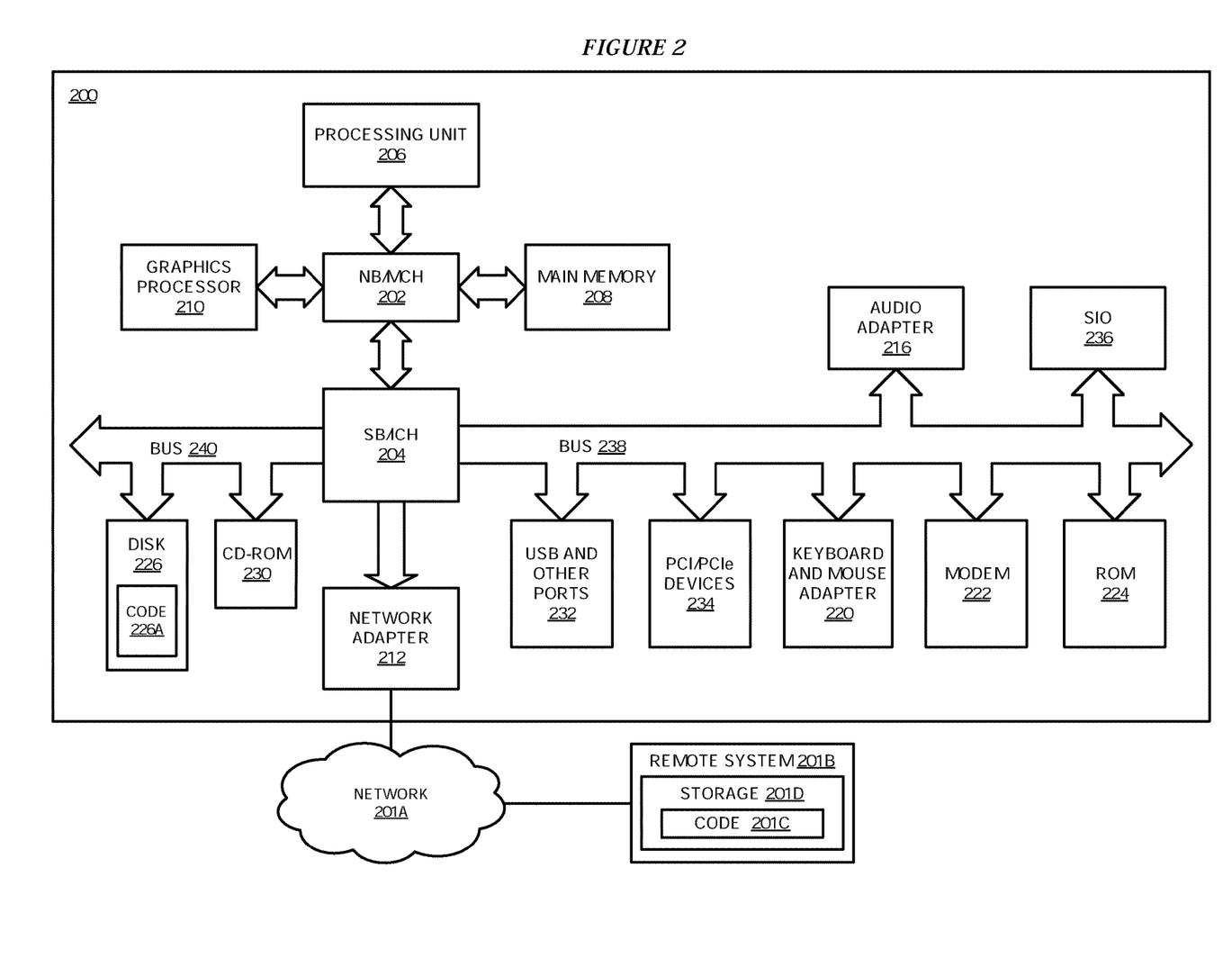
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 can run in any of servers 104 and 106, clients 110, 112, 114, and device 132. Application 105 stores documents and checkers in, for example, storage unit 108, or another location.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
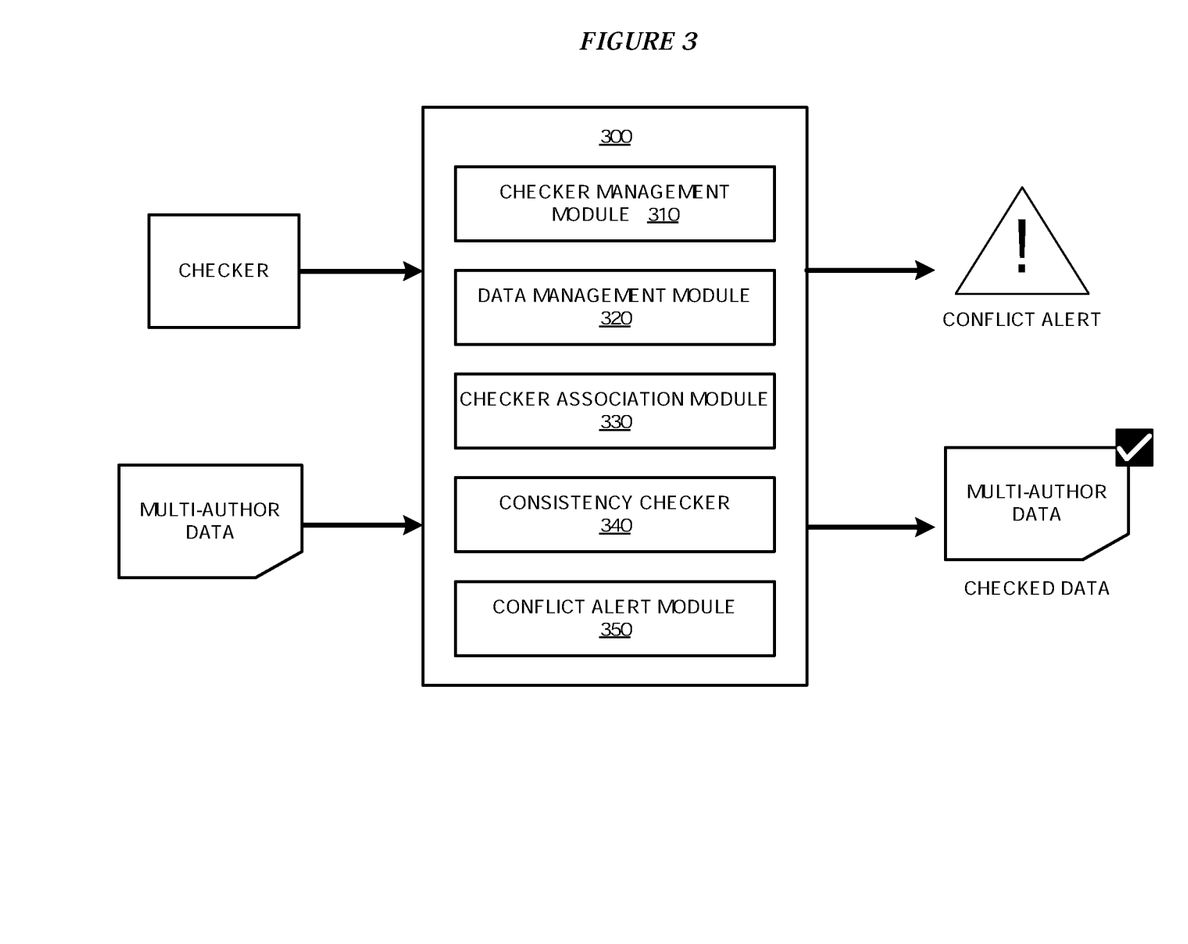
FIG. 3 depicts a block diagram of an example configuration for consistency enforcement in multi-author documents in accordance with an illustrative embodiment.

With reference to FIG. 3, this figure depicts a block diagram of an example configuration for consistency enforcement in multi-author documents in accordance with an illustrative embodiment. Application 300 is an example of application 105 in FIG. 1 and executes in any of servers 104 and 106, clients 110, 112, 114, and device 132 in FIG. 1.

Checker management module 310 configures, within a profile of at least one checker, one or more parameters enforcing a restriction on contents of a modification to a document. Module 310 can also include base forms of one or more checkers, for use in developing a checker specific to an author's particular need. Module 310 also manages checkers, including storing one or more checkers, managing ownership information and profile information for a checker, managing time, version, or document specifications for a checker, and managing other information relating to using a checker.

Data management module 320 intercepts reads and writes to a document. When a document author attempts a write to a document, module 320 triggers checker association module 330, which determines whether a checker is associated with the document. If so, consistency checker 340 uses one or more configured checkers to validate the modification to the document.

If consistency checker 340 reports that the modification has passed configured checks, data management module 320 stores the modified document. If, instead, consistency checker 340 reports an error in the modification, data management module 320 rejects the modification. As well, conflict alert module 350 alerts both the modification owner and the owner of each checker that reported an error.

When a document consumer attempts a read of the document, module 320 triggers checker association module 330 to determine whether a checker is associated with the document. If so, consistency checker 340 uses one or more configured checkers to validate the document. If consistency checker 340 reports that the document has passed configured checks, module 320 supplies the document to the consumer. If, instead, consistency checker 340 reports an error in the document, module 320 returns the document to a previous, validated state in which no checker had reported an error.

When a checker owner attempts to modify a checker, checker management module 310 triggers consistency checker 340 to validate the modification against the document being checked. If consistency checker 340 does not report an error, module 310 stores the modified checker and adds the modified checker to the set of checkers used to validate document modifications.

If, instead, consistency checker 340 reports an error, module 310 rejects the checker being modified. As well, conflict alert module 350 alerts the owner of the checker being modified.

Figure 4:
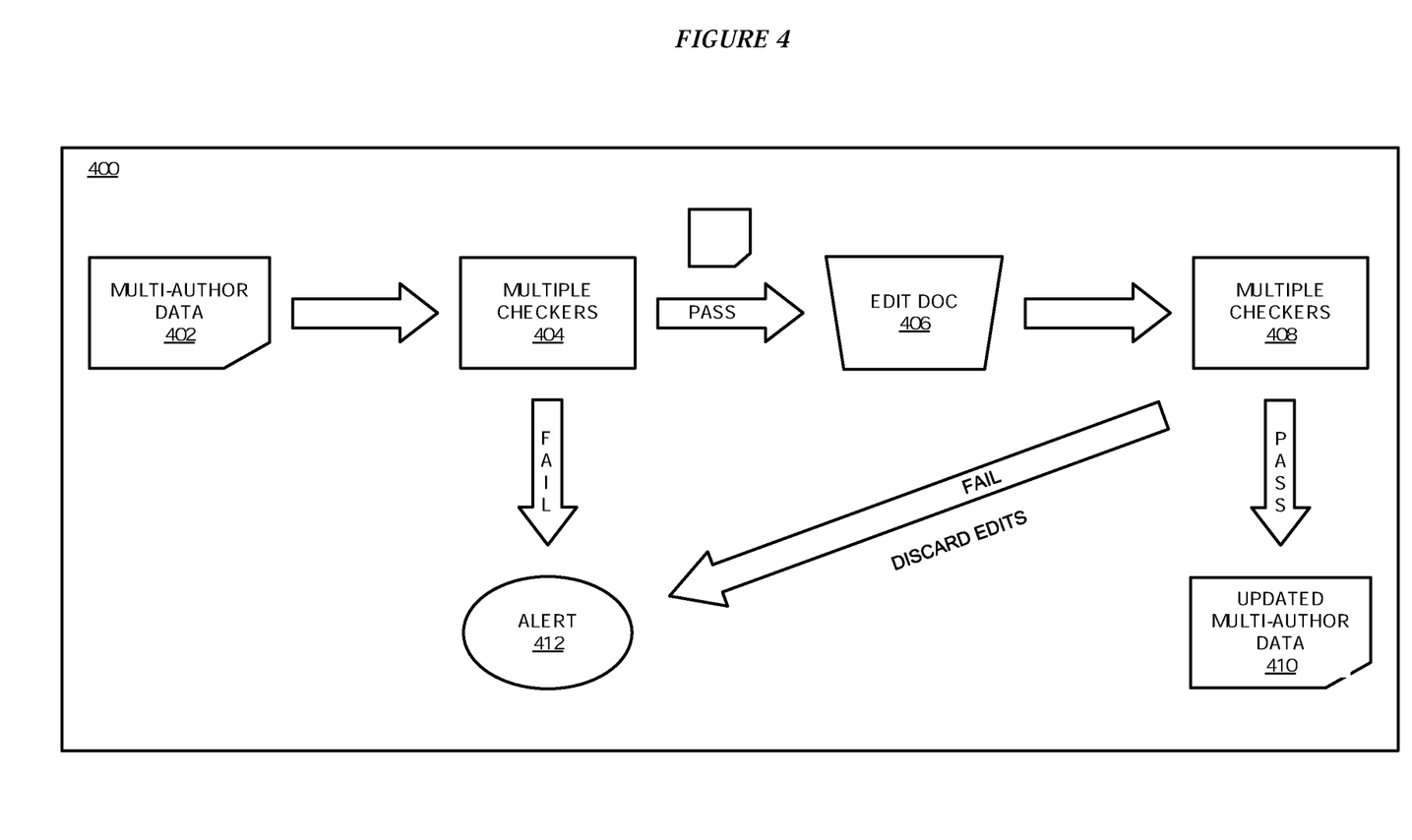
FIG. 4 depicts a process flow diagram of the operation of an example configuration for consistency enforcement in multi-author documents in accordance with an illustrative embodiment.

With reference to FIG. 4, this figure depicts a process flow diagram of the operation of an example configuration for consistency enforcement in multi-author documents in accordance with an illustrative embodiment. Diagram 400 can be implemented using application 300 in FIG. 3.

In step 402, a read of a multi-author document is requested. In step 404, the application uses checkers associated with the document to validate the document. If one or more checkers determines that there is an error, in step 412 the application generates an alert. If the document passes the checkers, in step 406 the document is edited.

When an attempt is made to write the edited document back to storage, the application again uses checkers associated with the document to validate the document. If one or more checkers determines that there is an error, the application discards the edits, and in step 412 the application generates an alert. If the document passes the checkers, in step 410 the updated document is stored.

Figure 5:
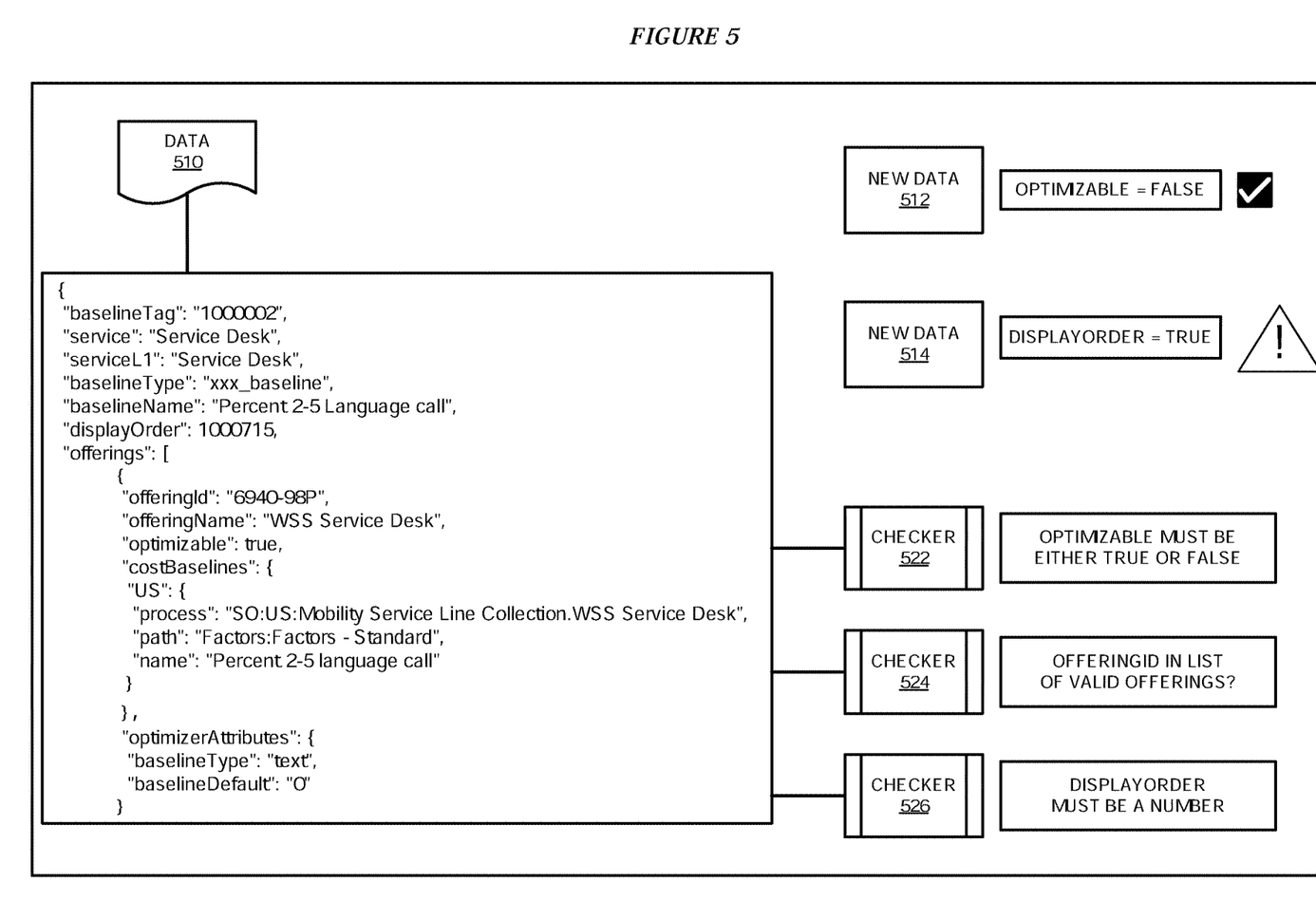
FIG. 5 depicts an example of consistency enforcement in multi-author documents in accordance with an illustrative embodiment.

With reference to FIG. 5, this figure depicts an example of consistency enforcement in multi-author documents in accordance with an illustrative embodiment. The example can be implemented using application 300 in FIG. 3.

Data 510 is a portion of an example document subject to consistency enforcement. Data 510 currently has three example checkers. Checker 522 enforces a restriction that "optimizable" must be either true or false. Checker 524 enforces a restriction that the numerical value for another variable, "offeringId", must be in a list of valid identification values. Checker 526 enforces a restriction that the value of another variable, "displayOrder", must be a number.

New data 512 is a modification to data 510 that changes the value of a variable, "optimizable", from true to false. Because the modification passes all three example checkers, the application accepts the modification.

New data 514 is a modification to data 510 that changes the value of the "displayOrder" variable to true. This time, checker 526 fails, because true is not a number in this example system. As a result, the application generates an alert, to both the modification owner and the owner of checker 526, that the modification is attempting to set "displayOrder" to an invalid value.

Figure 6:
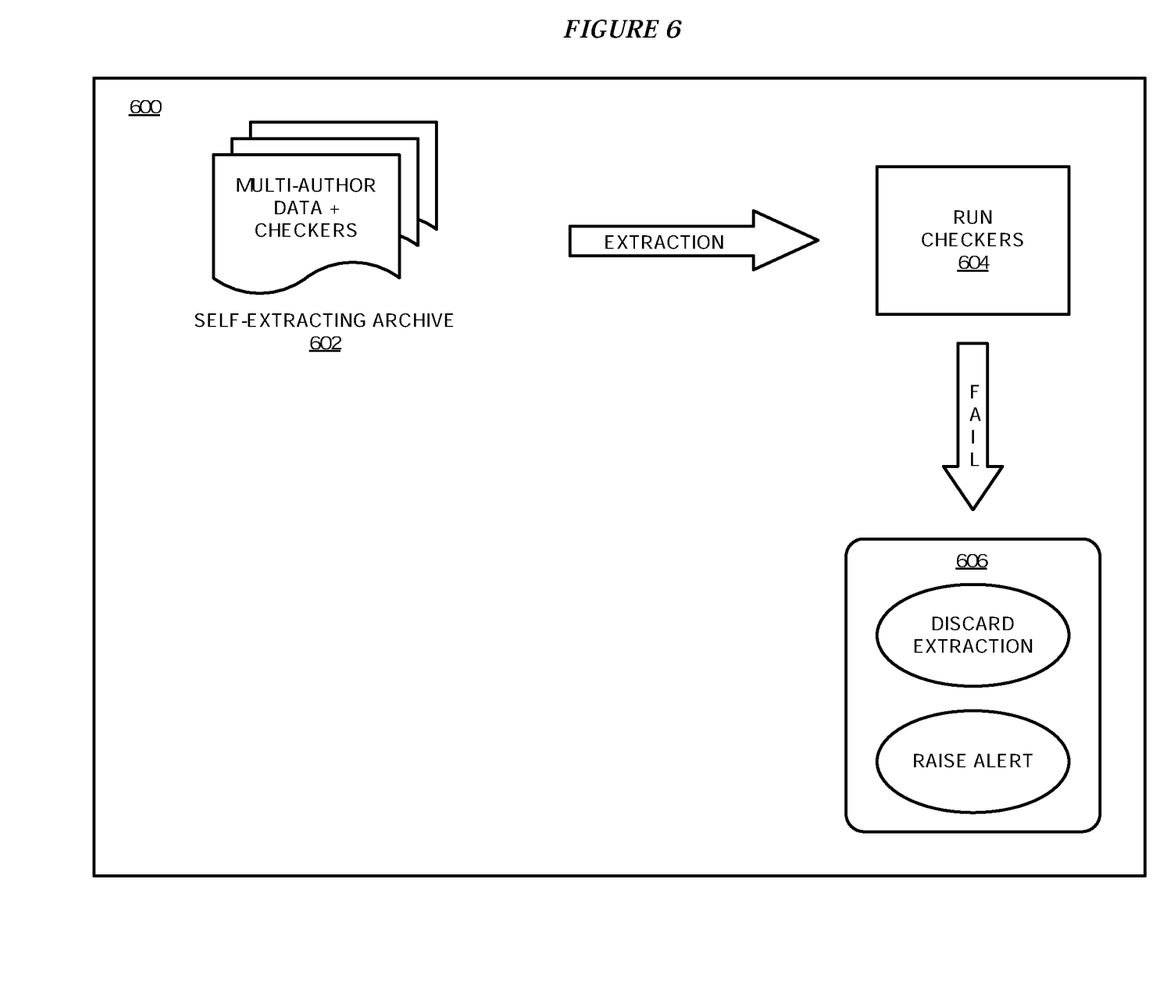
FIG. 6 depicts another process flow diagram of an example configuration for consistency enforcement in multi-author documents in accordance with an illustrative embodiment.

With reference to FIG. 6, this figure depicts another process flow diagram of an example configuration for consistency enforcement in multi-author documents in accordance with an illustrative embodiment. Diagram 600 can be implemented using application 300 in FIG. 3.

Self-extracting archive 602 includes an archive of documents, and any checkers for the archive, packaged together. When a document consumer attempts a read of a document from the archive, the application, in step 604, uses one or more checkers packaged with archive 602 to validate the document. If no checker reports an error, the application supplies the document to the consumer. If, instead, a checker reports an error in the document, in step 606 the application raises an alert and discards the document extraction.

Figure 7:
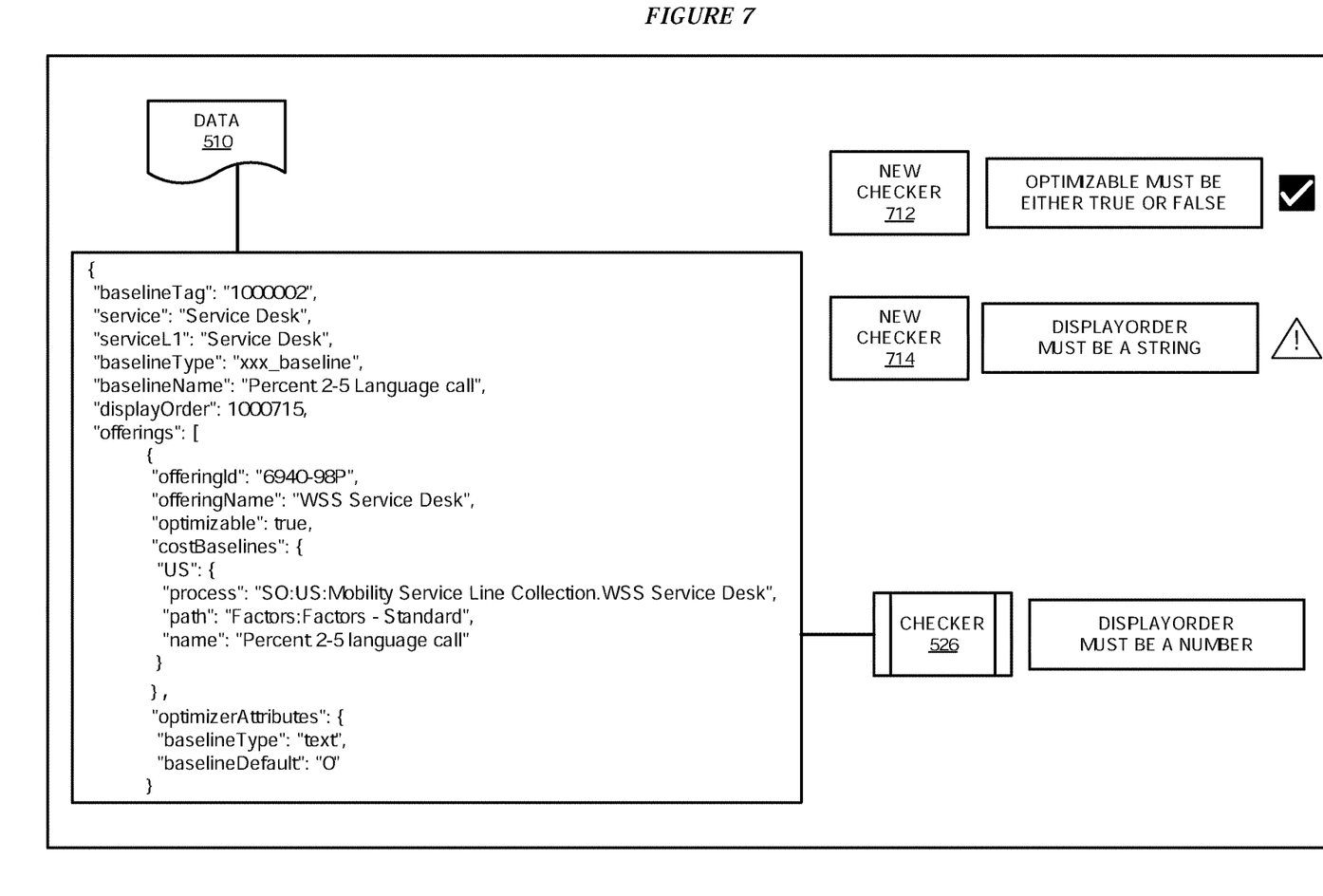
FIG. 7 depicts another example of consistency enforcement in multi-author documents in accordance with an illustrative embodiment.

With reference to FIG. 7, this figure depicts another example of consistency enforcement in multi-author documents in accordance with an illustrative embodiment. The example can be implemented using application 300 in FIG. 3. Data 510 and checker 526 are the same as Data 510 and checker 526 in FIG. 5.

New checker 712 is intended to check data 510, an example document. Data 510 currently has checker 526, which enforces a restriction that the value of a variable in the document, "displayOrder", must be a number. New checker 712 enforces a restriction that the value of another variable in data 510, "optimizable", must be either true or false. Because, in data 510, "optimizable" is set to true, meeting the new restriction, the application accepts new checker 712.

New checker 714 is also intended to check data 510. New checker 714 enforces a restriction that the "displayOrder" variable must be a string. This time, because checker 526 already specifies that "displayOrder" must be a number, in data 510 "displayOrder" is set to a number. As a result, because a variable cannot be both a number and a string at the same time, the validation fails, and the application alerts the author of checker 714.

Figure 8:
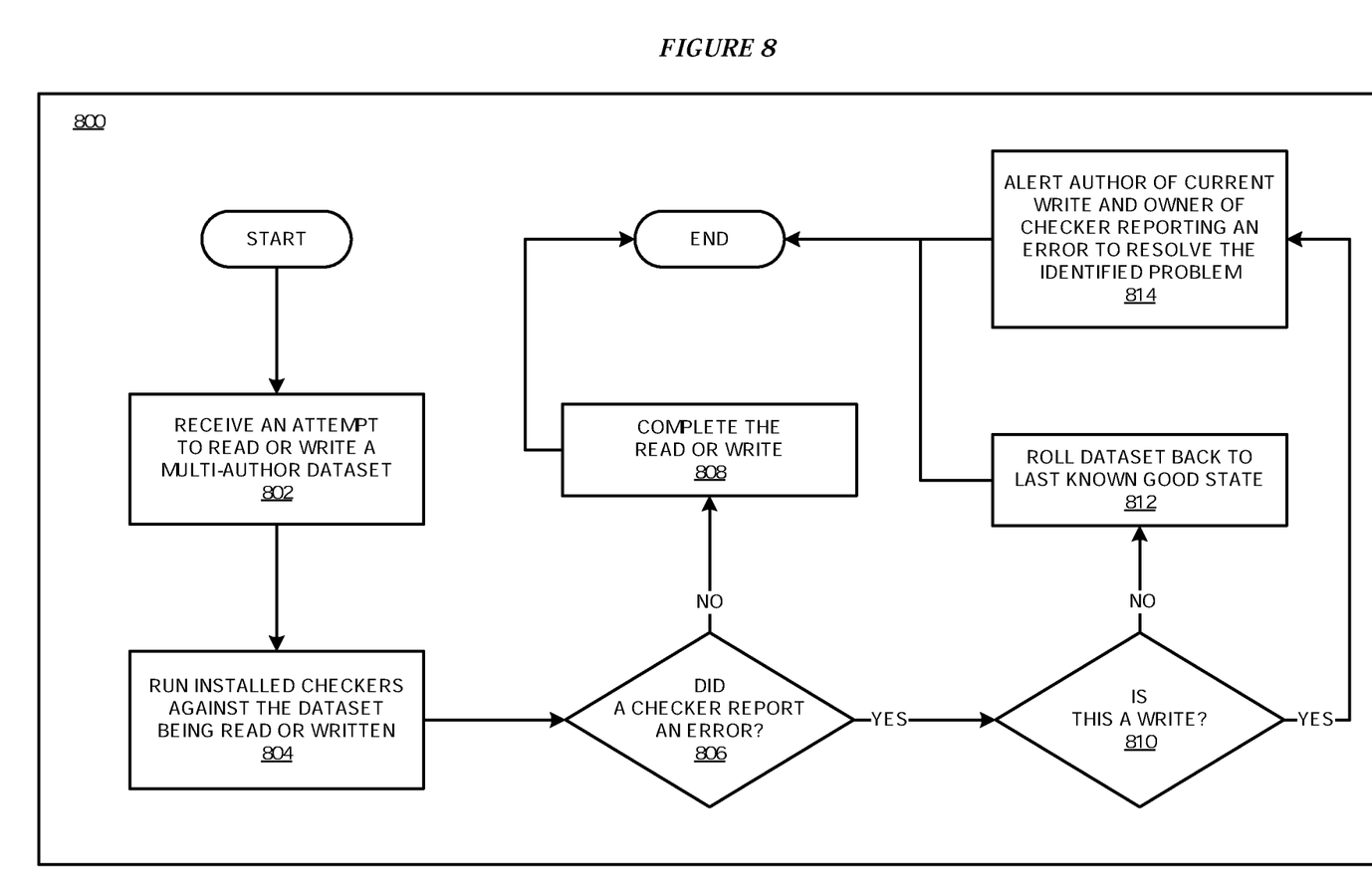
FIG. 8 depicts a flowchart of an example process for consistency enforcement in multi-author documents in accordance with an illustrative embodiment.

With reference to FIG. 8, this figure depicts a flowchart of an example process for consistency enforcement in multi-author documents in accordance with an illustrative embodiment. Process 800 can be implemented in application 300 in FIG. 3.

In block 802, the application receives an attempt to read or write a multi-author dataset such as a document. In block 804, the application runs one or more installed checkers against the data being read or written. In block 806, the application determines whether a checker reported an error. If not ("NO" path of block 806), in block 808 the application completes the data read or write, as appropriate, then ends. If yes ("YES" path of block 806), in block 810 the application determines whether a read or a write is being processed. For a read ("NO" path of block 810), in block 812 the application rolls the dataset back to the last known good state, then ends. For a write ("YES" path of block 810), in block 814 the application alerts the author of the current write operation and the owner of the checker reporting an error to resolve the identified problem, then ends.

Figure 9:
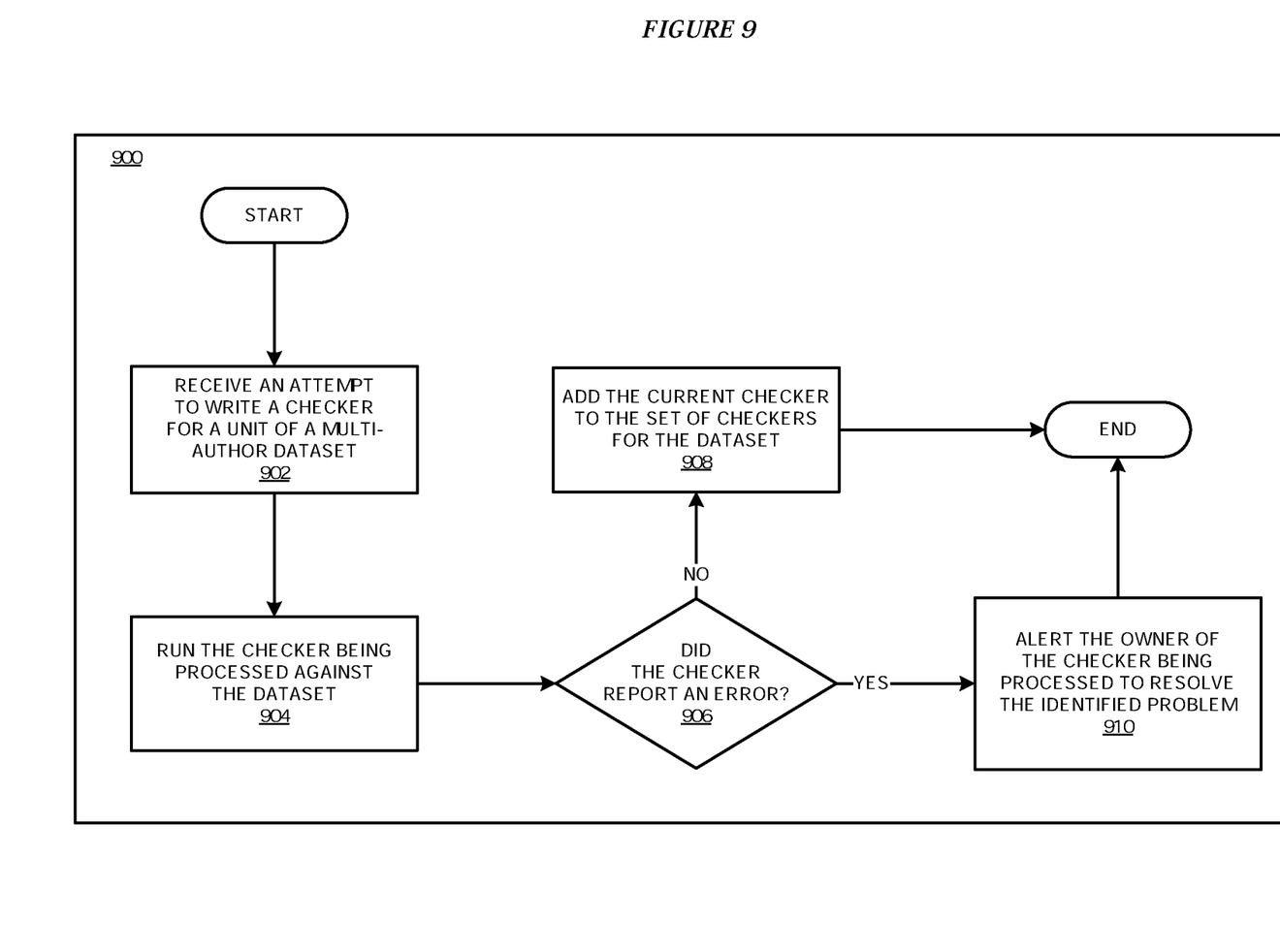
FIG. 9 depicts a flowchart of an example process for consistency enforcement in multi-author documents in accordance with an illustrative embodiment.

With reference to FIG. 9, this figure depicts a flowchart of an example process for consistency enforcement in multi-author documents in accordance with an illustrative embodiment. Process 900 can be implemented in application 300 in FIG. 3.

In block 902, the application receives an attempt to write a checker for a unit of a multi-author dataset. In block 904, the application validates the checker currently being processed against the dataset. In block 906, the application determines whether the checker reported an error. If not ("NO" path of block 906), in block 908 the application adds the current checker to the set of checkers for the dataset, then ends. If yes ("YES" path of block 906), in block 910 the application alerts the author of the current checker to resolve the identified problem, then ends.

Thus, a computer implemented method, system or apparatus, and computer program product are provided in the illustrative embodiments for consistency enforcement in multi-author documents and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    configuring a parameter of a first checker in a profile of the first checker, wherein the parameter comprises a restriction on a content of a human readable and machine interpretable modification to a document file, the document file modifiable by a plurality of authors, the first checker having a first checker owner;
    validating, against a restriction enforced by the first checker according to the parameter, a content of a first modification to the document file, the first modification having a modification owner, wherein the content of the first modification comprises human-readable and machine interpretable data and a human-readable and machine interpretable format of that data, and wherein changing the data changes a machine interpretation of the data, the validating comprising determining, using the first checker, whether a value of a variable specified in the content of the first modification complies with the restriction; and
    allowing, responsive to the validating detecting that the content of the first modification is acceptable, the content of the first modification to be written to the document file.

2. The computer-implemented method of claim 1, further comprising:
    validating, against the restriction enforced by the first checker according to the parameter, a content of a second modification to the document file;
    rejecting, responsive to the validating detecting an error in the content of the second modification, the second modification; and
    causing the replacing of a nonconforming modification with a conforming operation.

3. The computer-implemented method of claim 1, further comprising:
    receiving a restriction modification to the first profile of the first checker, the restriction modification comprising a modification to a restriction enforced by the first checker according to the parameter, wherein the modification comprises a modification of a functionality implemented in the checker;
    validating, against the document file, the second checker; and
    rejecting, responsive to the validating detecting a conflict between the restriction modification and the document file, the restriction modification.

4. The computer-implemented method of claim 3, further comprising:
    alerting, responsive to the rejecting, the first checker owner.

5. The computer-implemented method of claim 1, further comprising:
    validating, against a restriction enforced by the first checker according to the parameter, the document file; and
    modifying, responsive to the validating detecting an error in the document file, the modifying comprising returning the document file to a previous validated state.

6. The computer-implemented method of claim 5, wherein the validating is triggered by a first read from the document file.

7. The computer-implemented method of claim 1, further comprising:
    validating, against a restriction enforced by the first checker according to the parameter, the document file; and
    generating, responsive to the validating detecting an error in the document file, an error alert.

8. The computer-implemented method of claim 7, wherein the document file and the first checker are packaged together in a self-extracting archive.

9. A computer usable program product comprising one or more computer-readable storage devices, and program instructions stored on at least one of the one or more storage devices, the stored program instructions comprising:
    program instructions to configure a parameter of a first checker in a profile of the first checker, wherein the parameter comprises a restriction on a content of a human readable and machine interpretable modification to a document file, the document file modifiable by a plurality of authors, the first checker having a first checker owner;
    program instructions to validate, against a restriction enforced by the first checker according to the parameter, a content of a first modification to the document file, the first modification having a modification owner, wherein the content of the first modification comprises human-readable and machine interpretable data and a human-readable and machine interpretable format of that data, and wherein changing the data changes a machine interpretation of the data, the validating comprising determining, using the first checker, whether a value of a variable specified in the content of the first modification complies with the restriction; and
    program instructions to allow, responsive to the validating detecting that the content of the first modification is acceptable, the content of the first modification to be written to the document file.

10. The computer usable program product of claim 9, further comprising:
    program instructions to validate, against the restriction enforced by the first checker according to the parameter, a content of a second modification to the document file dataset; and program instructions to reject, responsive to the validating detecting an error in the content of the second modification, the second modification; and program instructions to cause the replacing of a nonconforming modification with a conforming operation.

11. The computer usable program product of claim 9, further comprising:

program instructions to receive a restriction modification to the first profile of the first checker, the restriction modification comprising a modification to a restriction enforced by the first checker according to the parameter, wherein the modification comprises a modification of a functionality implemented in the checker;

program instructions to validate, against the document file, the second checker; and program instructions to reject, responsive to the validating detecting a conflict between the restriction modification and the document file, the restriction modification.

12. The computer usable program product of claim 11, further comprising:

program instructions to alert, responsive to the rejecting, the first checker owner.

13. The computer usable program product of claim 9, further comprising:

program instructions to validate, against a restriction enforced by the first checker according to the parameter, the document file; and program instructions to modify, responsive to the validating detecting an error in the document file, the modifying comprising returning the document file to a previous validated state.

14. The computer usable program product of claim 13, wherein the validating is triggered by a first read from the document file.

15. The computer usable program product of claim 9, further comprising:

program instructions to validate, against a restriction enforced by the first checker according to the parameter, the document file; and program instructions to generate, responsive to the validating detecting an error in the document file, an error alert.

16. The computer usable program product of claim 15, wherein the document file and the first checker are packaged together in a self-extracting archive.

17. The computer usable program product of claim 9, wherein the computer usable code is stored in a computer readable storage device in a data processing system, and wherein the computer usable code is transferred over a network from a remote data processing system.

18. The computer usable program product of claim 9, wherein the computer usable code is stored in a computer readable storage device in a server data processing system, and wherein the computer usable code is downloaded over a network to a remote data processing system for use in a computer readable storage device associated with the remote data processing system.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to configure a parameter of a first checker in a profile of the first checker, wherein the parameter comprises a restriction on a content of a human readable and machine interpretable modification to a document file, the document file modifiable by a plurality of authors, the first checker having a first checker owner;

program instructions to validate, against a restriction enforced by the first checker according to the parameter, a content of a first modification to the document file, the first modification having a modification owner, wherein the content of the first modification comprises human-readable and machine interpretable data and a human-readable and machine interpretable format of that data, and wherein changing the data changes a machine interpretation of the data, the validating comprising determining, using the first checker, whether a value of a variable specified in the content of the first modification complies with the restriction; and program instructions to allow, responsive to the validating detecting that the content of the first modification is acceptable, the content of the first modification to be written to the document file.

20. The computer system of claim 19, further comprising:

program instructions to validate, against the restriction enforced by the first checker according to the parameter, a content of a second modification to the document file dataset; and program instructions to reject, responsive to the validating detecting an error in the content of the second modification, the second modification; and program instructions to cause the replacing of a nonconforming modification with a conforming operation.

* * * * *